US008938252B2

(12) United States Patent
Alles et al.

(10) Patent No.: US 8,938,252 B2
(45) Date of Patent: Jan. 20, 2015

(54) SYSTEM AND METHOD TO COLLECT AND MODIFY CALIBRATION DATA

(75) Inventors: Martin Alles, Vienna, VA (US); John Carlson, Dulles, VA (US); George Maher, Herndon, VA (US); Selcuk Mazlum, Leesburg, VA (US)

(73) Assignee: Andrew LLC, Hickory, NC (US)

( * ) Notice: Subject to any disclaimer, the term of this patent is extended or adjusted under 35 U.S.C. 154(b) by 1817 days.

(21) Appl. No.: 12/026,372

(22) Filed: Feb. 5, 2008

(65) Prior Publication Data

US 2008/0189321 A1 Aug. 7, 2008

Related U.S. Application Data

(60) Provisional application No. 60/899,379, filed on Feb. 5, 2007.

(51) Int. Cl.
*H04W 24/00* (2009.01)
*H04W 4/02* (2009.01)
*G01S 5/02* (2010.01)

(52) U.S. Cl.
CPC ............... *H04W 4/02* (2013.01); *G01S 5/021* (2013.01); *G01S 5/0252* (2013.01); *G01S 5/0257* (2013.01)
USPC .............. 455/456.1; 342/357.29; 455/456.5; 455/456.6

(58) Field of Classification Search
CPC . H04W 64/90; H04W 64/003; H04W 64/006; H04W 4/02
USPC ........ 455/404.2, 422.1, 423, 425, 433, 435.1, 455/435.2, 435.3, 456.1–456.6; 340/8.1, 340/539.13, 539.21, 539.23, 870.04, 340/870.05, 905, 935, 936, 988, 989, 991, 340/995.18, 995.24, 995.25; 342/357.2–358, 450, 457; 701/200–225; 702/85, 94–97, 142, 150
See application file for complete search history.

(56) References Cited

U.S. PATENT DOCUMENTS

| 3,150,372 A | 9/1964 | Edward, Jr. |
| 3,659,085 A | 4/1972 | Potter et al. |

(Continued)

FOREIGN PATENT DOCUMENTS

| EP | 1471688 A2 | 10/2004 |
| JP | 06-347529 | 12/1994 |

(Continued)

OTHER PUBLICATIONS

A.J. Paulraj, C.B. Papadias, "Space-Time Processing for Wireless Communications", IEEE Signal Processing Magazine, vol. 11, Nov. 1997, pp. 49-83.

(Continued)

*Primary Examiner* — Mazda Sabouri
(74) *Attorney, Agent, or Firm* — Duane Morris LLP

(57) ABSTRACT

A system and method modifies calibration data used to geo-locate a mobile station. Calibration data measured via a calibration data collection device may contain errors due to the physical limitations of the collection device and/or the collection process. Any data collection device may produce some degree of signal degradation or drop-out. Dead reckoning provides a remedy for signal drop-out, however, it often produces data results that may be unsatisfactory to perform an accurate location estimate. To ensure the integrity of the collected calibration data, a data modification and/or data replacement algorithm may be implemented to enhance the accuracy of the collected data. In addition, current collection procedures used to generate a calibration database may be laborious, time-consuming and expensive. Simplifying the test and measurement equipment needed, and the procedures for obtaining calibration data may save time and expenses.

24 Claims, 8 Drawing Sheets

(56) References Cited

U.S. PATENT DOCUMENTS

| | | |
|---|---|---|
| 4,728,959 A | 3/1988 | Maloney |
| 4,814,751 A | 3/1989 | Hawkins |
| 4,845,504 A | 7/1989 | Roberts et al. |
| 4,891,650 A | 1/1990 | Sheffer |
| 5,056,106 A | 10/1991 | Wang |
| 5,218,618 A | 6/1993 | Sagey |
| 5,317,323 A | 5/1994 | Kennedy et al. |
| 5,327,144 A | 7/1994 | Stilp et al. |
| 5,365,544 A | 11/1994 | Schilling |
| 5,372,144 A | 12/1994 | Mortier et al. |
| 5,404,376 A | 4/1995 | Dent |
| 5,423,067 A | 6/1995 | Manabe |
| 5,465,289 A | 11/1995 | Kennedy |
| 5,506,863 A | 4/1996 | Meidan et al. |
| 5,506,864 A | 4/1996 | Schilling |
| 5,508,708 A | 4/1996 | Ghosh et al. |
| 5,512,908 A | 4/1996 | Herrick |
| 5,515,419 A | 5/1996 | Sheffer |
| 5,519,760 A | 5/1996 | Borkowski et al. |
| 5,559,864 A | 9/1996 | Kennedy |
| 5,592,180 A | 1/1997 | Yokev et al. |
| 5,608,410 A | 3/1997 | Stilp et al. |
| 5,614,914 A | 3/1997 | Bolgiano et al. |
| 5,675,344 A | 10/1997 | Tong et al. |
| 5,736,964 A | 4/1998 | Ghosh et al. |
| 5,815,538 A | 9/1998 | Grell et al. |
| 5,825,887 A | 10/1998 | Lennen |
| 5,870,029 A | 2/1999 | Otto et al. |
| 5,920,278 A | 7/1999 | Tyler et al. |
| 5,952,969 A | 9/1999 | Hagerman et al. |
| 5,959,580 A | 9/1999 | Maloney et al. |
| 5,960,341 A | 9/1999 | LeBlanc et al. |
| 5,973,643 A | 10/1999 | Hawkes et al. |
| 5,987,329 A | 11/1999 | Yost |
| 6,014,102 A | 1/2000 | Mitzlaff et al. |
| 6,047,192 A | 4/2000 | Maloney |
| 6,091,362 A | 7/2000 | Stilp |
| 6,097,336 A | 8/2000 | Stilp |
| 6,097,709 A | 8/2000 | Kuwabara |
| 6,097,959 A | 8/2000 | Yost |
| 6,101,178 A | 8/2000 | Beal |
| 6,108,555 A | 8/2000 | Maloney et al. |
| 6,108,558 A | 8/2000 | Vanderspool, II |
| 6,115,599 A | 9/2000 | Stilp |
| 6,115,605 A | 9/2000 | Siccardo et al. |
| 6,119,013 A | 9/2000 | Maloney et al. |
| 6,127,975 A | 10/2000 | Maloney |
| 6,144,711 A | 11/2000 | Raleigh et al. |
| 6,172,644 B1 | 1/2001 | Stilp |
| 6,184,829 B1 | 2/2001 | Stilp |
| 6,188,351 B1 | 2/2001 | Bloebaum |
| 6,191,738 B1 | 2/2001 | Pfeil et al. |
| 6,201,499 B1 | 3/2001 | Hawkes et al. |
| 6,201,803 B1 | 3/2001 | Munday et al. |
| 6,212,319 B1 | 4/2001 | Cayrefourcq |
| 6,233,459 B1 | 5/2001 | Sullivan et al. |
| 6,246,884 B1 | 6/2001 | Karmi et al. |
| 6,266,013 B1 | 7/2001 | Stilp et al. |
| 6,268,825 B1 * | 7/2001 | Okada ................... 342/357.52 |
| 6,269,246 B1 | 7/2001 | Rao et al. |
| 6,281,834 B1 | 8/2001 | Stilp |
| 6,285,321 B1 | 9/2001 | Stilp et al. |
| 6,288,675 B1 | 9/2001 | Maloney |
| 6,288,676 B1 | 9/2001 | Maloney |
| 6,295,455 B1 | 9/2001 | Fischer et al. |
| 6,311,043 B1 | 10/2001 | Haardt et al. |
| 6,317,081 B1 | 11/2001 | Stilp |
| 6,317,604 B1 | 11/2001 | Kovach, Jr. et al. |
| 6,334,059 B1 | 12/2001 | Stilp et al. |
| 6,351,235 B1 | 2/2002 | Stilp |
| 6,366,241 B2 | 4/2002 | Pack |
| 6,388,618 B1 | 5/2002 | Stilp et al. |
| 6,393,294 B1 | 5/2002 | Perez-Breva et al. |
| 6,400,320 B1 | 6/2002 | Stilp et al. |
| 6,407,703 B1 | 6/2002 | Minter et al. |
| 6,449,486 B1 | 9/2002 | Rao |
| 6,463,290 B1 | 10/2002 | Stilp et al. |
| 6,470,195 B1 | 10/2002 | Meyer |
| 6,477,161 B1 | 11/2002 | Hudson |
| 6,483,460 B2 | 11/2002 | Stilp et al. |
| 6,492,944 B1 | 12/2002 | Stilp |
| 6,501,955 B1 | 12/2002 | Durrant et al. |
| 6,519,465 B2 | 2/2003 | Stilp et al. |
| 6,546,256 B1 | 4/2003 | Maloney |
| 6,553,322 B1 | 4/2003 | Ignagni |
| 6,563,460 B2 | 5/2003 | Stilp et al. |
| 6,571,082 B1 | 5/2003 | Rahman |
| 6,591,112 B1 | 7/2003 | Siccardo et al. |
| 6,603,428 B2 | 8/2003 | Stilp |
| 6,603,761 B1 | 8/2003 | Wang |
| 6,640,106 B2 | 10/2003 | Gutowski et al. |
| 6,646,604 B2 | 11/2003 | Anderson |
| 6,661,379 B2 | 12/2003 | Stilp et al. |
| 6,765,531 B2 | 7/2004 | Anderson |
| 6,771,625 B1 | 8/2004 | Beal |
| 6,771,969 B1 | 8/2004 | Chinoy |
| 6,782,264 B2 | 8/2004 | Anderson |
| 6,782,265 B2 | 8/2004 | Perez-Breva et al. |
| 6,834,234 B2 | 12/2004 | Scherzinger et al. |
| 6,839,539 B2 | 1/2005 | Durrant et al. |
| 6,845,240 B2 | 1/2005 | Carlson et al. |
| 6,859,172 B2 | 2/2005 | Powers et al. |
| 6,871,077 B2 | 3/2005 | Kennedy, Jr. |
| 6,873,290 B2 | 3/2005 | Anderson et al. |
| 6,876,859 B2 | 4/2005 | Anderson et al. |
| 6,920,329 B2 | 7/2005 | Kennedy, Jr. et al. |
| 6,922,170 B2 | 7/2005 | Alexander, Jr. |
| 6,944,465 B2 | 9/2005 | Spain et al. |
| 6,952,158 B2 | 10/2005 | Kennedy, Jr. |
| 6,987,979 B2 | 1/2006 | Carlsson |
| 6,996,392 B2 | 2/2006 | Anderson |
| 7,023,383 B2 | 4/2006 | Stilp et al. |
| 7,116,987 B2 | 10/2006 | Spain, Jr. et al. |
| 7,167,713 B2 | 1/2007 | Anderson |
| 7,167,714 B2 | 1/2007 | Dressler et al. |
| 7,233,799 B2 | 6/2007 | Spain, Jr. |
| 7,250,907 B2 | 7/2007 | Krumm et al. |
| 7,257,414 B2 | 8/2007 | Spain, Jr. et al. |
| 7,271,765 B2 | 9/2007 | Stilp et al. |
| 7,280,071 B2 * | 10/2007 | Awata ...................... 342/357.35 |
| 7,340,259 B2 | 3/2008 | Maloney |
| 7,383,051 B2 | 6/2008 | Spain, Jr. et al. |
| 7,427,952 B2 | 9/2008 | Bull et al. |
| 7,433,652 B2 | 10/2008 | Durgin |
| 7,433,695 B2 | 10/2008 | Gordon et al. |
| 7,440,762 B2 | 10/2008 | Maloney et al. |
| 7,456,784 B2 * | 11/2008 | Beason et al. ........... 342/357.34 |
| 7,460,505 B2 | 12/2008 | Spain |
| 7,593,738 B2 | 9/2009 | Anderson |
| 7,725,111 B2 | 5/2010 | Dressler et al. |
| 7,734,298 B2 | 6/2010 | Bhattacharya et al. |
| 7,753,278 B2 | 7/2010 | Spain, Jr. et al. |
| 7,796,966 B2 | 9/2010 | Bhattacharya et al. |
| 7,848,762 B2 | 12/2010 | Gordon et al. |
| 7,899,467 B2 | 3/2011 | Feuerstein et al. |
| 8,013,785 B2 | 9/2011 | Bhattacharya et al. |
| 8,068,802 B2 | 11/2011 | Bhattacharya et al. |
| 8,068,855 B2 | 11/2011 | Dressler et al. |
| 8,106,817 B2 | 1/2012 | Bhattacharya et al. |
| 8,106,818 B2 | 1/2012 | Bhattacharya et al. |
| 8,155,394 B2 | 4/2012 | Allegra et al. |
| 2002/0172223 A1 | 11/2002 | Stilp et al. |
| 2003/0064734 A1 | 4/2003 | Stilp et al. |
| 2003/0139188 A1 | 7/2003 | Chen et al. |
| 2003/0190919 A1 | 10/2003 | Niemenmaa |
| 2003/0203738 A1 | 10/2003 | Brown et al. |
| 2004/0024522 A1 * | 2/2004 | Walker et al. ................. 701/210 |
| 2004/0043775 A1 | 3/2004 | Kennedy, Jr. et al. |
| 2004/0132466 A1 | 7/2004 | Kennedy, Jr. et al. |
| 2004/0203539 A1 | 10/2004 | Benes et al. |
| 2004/0203921 A1 | 10/2004 | Bromhead et al. |
| 2004/0218664 A1 | 11/2004 | Kennedy, Jr. et al. |
| 2004/0252752 A1 | 12/2004 | Kennedy, Jr. et al. |
| 2005/0040968 A1 | 2/2005 | Damarla et al. |

(56) References Cited

U.S. PATENT DOCUMENTS

| | | |
|---|---|---|
| 2005/0058182 A1 | 3/2005 | Kennedy, Jr. et al. |
| 2005/0078033 A1 | 4/2005 | Tamaki et al. |
| 2005/0136945 A1 | 6/2005 | Kennedy, Jr. et al. |
| 2005/0164712 A1 | 7/2005 | Kennedy, Jr. et al. |
| 2005/0165545 A1* | 7/2005 | Obradovich et al. ......... 701/208 |
| 2005/0176442 A1 | 8/2005 | Ju et al. |
| 2005/0192026 A1 | 9/2005 | Carlson et al. |
| 2005/0243936 A1 | 11/2005 | Agrawala et al. |
| 2005/0266855 A1 | 12/2005 | Zeng et al. |
| 2006/0003695 A1 | 1/2006 | Kennedy, Jr. et al. |
| 2006/0003775 A1 | 1/2006 | Bull et al. |
| 2006/0030333 A1 | 2/2006 | Ward et al. |
| 2006/0116130 A1 | 6/2006 | Kennedy, Jr. et al. |
| 2006/0125695 A1 | 6/2006 | Kennedy, Jr. et al. |
| 2006/0141998 A1 | 6/2006 | Kennedy, Jr. et al. |
| 2006/0154607 A1 | 7/2006 | Kenney, Jr. et al. |
| 2006/0240836 A1 | 10/2006 | Kennedy, Jr. et al. |
| 2006/0240843 A1 | 10/2006 | Spain et al. |
| 2007/0087689 A1 | 4/2007 | Kennedy, Jr. et al. |
| 2007/0111746 A1 | 5/2007 | Anderson et al. |
| 2007/0155401 A1 | 7/2007 | Ward et al. |
| 2007/0155489 A1 | 7/2007 | Beckley et al. |
| 2007/0202885 A1 | 8/2007 | Kennedy, Jr. et al. |
| 2008/0132244 A1 | 6/2008 | Anderson et al. |
| 2008/0132247 A1 | 6/2008 | Anderson et al. |
| 2008/0137524 A1 | 6/2008 | Anderson et al. |
| 2008/0158059 A1 | 7/2008 | Bull et al. |
| 2008/0160952 A1 | 7/2008 | Bull et al. |
| 2008/0160953 A1 | 7/2008 | Mia et al. |
| 2008/0161015 A1 | 7/2008 | Maloney et al. |
| 2008/0248811 A1 | 10/2008 | Maloney et al. |
| 2008/0261611 A1 | 10/2008 | Mia et al. |
| 2008/0261612 A1 | 10/2008 | Mia et al. |
| 2008/0261613 A1 | 10/2008 | Anderson et al. |
| 2008/0261614 A1 | 10/2008 | Mia et al. |
| 2009/0005061 A1 | 1/2009 | Ward et al. |
| 2009/0005987 A1* | 1/2009 | Vengroff et al. ............... 701/300 |

FOREIGN PATENT DOCUMENTS

| | | |
|---|---|---|
| WO | 0034799 A1 | 6/2000 |
| WO | 02/082832 A2 | 10/2002 |
| WO | 2006088472 A1 | 8/2006 |

OTHER PUBLICATIONS

C.B. Papadias, A.J. Paulraj, "Space-Time Signal Processing for Wireless Communications: A Survey", Information Systems Laboratory, Stanford University.

M. Haardt, C. Brunner, J. Nossek, "Joint Estimation of 2-D Arrival Angles, Propagation Delays, and Doppler Frequencies in Wireless Communications," Proc. IEEE Digital Signal Processing Workshop, vol. 1, pp. 1-4, Bryce Canyon National Park, Utah, Aug. 1998.

Matt Wax, "Position Location from Sensors with Position Uncertainty," IEEE Transactions Aerospace and Electronic Systems, vol. AES-19, No. 5, Sep. 1983, pp. 658-662.

D.J. Torrieri, "Statistical Theory of Passive Location Systems", IEEE Transactions Aerospace and Electronic Systems, vol. AES-20, No. 2, Mar. 1984, pp. 183-198.

Y.T. Chan and K.C. Ho, "A Simple and Efficient Estimator for Hyperbolic Location", IEEE Transactions Signal Processing, vol. 42, No. 8, Aug. 1994, pp. 1905-1915.

W.H. Foy, "Position-Location Solutions by Taylor-Series Estimation", IEEE Transactions Aerospace and Electronic Systems, vol. AES-12, No. 2, Mar. 1976, pp. 187-194.

R.G. Stansfield, "Statistical Theory of DF Fixing", Journal IEE 94, Part III A, Oct. 1947, pp. 762-770.

M.P. Wylie and J. Holtzman, "The Non-Line of Sight Problem in Mobile Location Estimation", Process IEEE 5th International Conference on Universal Personal Communications, vol. 2, Oct. 1996, pp. 827-831.

L.Cong and W. Zhuang, "Non-Line-of-Sight Error Mitigation in TDOA Mobile Location", Process IEEE Global Telecommunications Conference, vol. 1, Sep. 2001, pp. 680-684.

P.C. Chen, "A Non-Line-of-Sight Error Mitigation Algorithm in Location Estimation", Process IEEE Conference on Wireless Communications Networking, vol. 1, 1999, pp. 316-320.

Y. Zhao, "Standardization of Mobile Phone Positioning for 3G Systems," IEEE Communications Magazine, Jul. 2002, pp. 108-116.

C. Drane, M. Macnaughtan, and C. Scott, "Positioning GSM Telephones," IEEE Communications Magazine, Apr. 1998, pp. 46-54, 59.

J. Caffery, Jr., and G. Stuber, "Overview of Radiolocation in CDMA Cellular Systems," IEEE Communications Magazine, Apr. 1998, pp. 38-45.

T. Rappaport, J.H. Reed and B.D. Woerner, "Position Location Using Wireless Communications on Highways of the Future," IEEE Communications Magazine, Oct. 1996, pp. 33-41.

I. Ziskind and M. Wax, "Maximum Likelihood Localization of Multiple Sources by Alternating Projection," IEEE Transactions on Acoustics, Speech, and Signal Porcessing, vol. 36, No. 10, pp. 1553-1560, Oct. 1988.

G.W.K. Colman, "A Comparison of the Accuracy of TDOA and TOA Location Algorithms with Equivalent Receiver Geometry," Defence R&D Canada Technical Memorandum (DREO TM 2001-063), Oct. 2001, pp. 1-53.

L. Mailaender, "On the Geolocation Bounds for Round-Trip Time-of-Arrival and All Non-Line-of-Sight Channels", EURASIP Journal on Advances in Signal Processing, vol. 2008, pp. 1-10.

N. Agarwal, L. Chaudran-Wadi, and V. Apte, "Capacity Analysis of the GSM Short Message Service", Indian Institute of Technology Bombay, www.cse.iitb.ac.in/~varsha/allpapers/wireless/ncc03cam.pdf, 2004, pp. 1-5.

J.D. Bard, and F.M. Ham, "Time Difference of Arrival Dilution of Precision and Applications," IEEE Transactions on Signal Processing, vol. 47, No. 2, pp. 521-523, Feb. 1999.

K.C. Ho, and W. Xu, "An Accurate Algebraic Solution for Moving Source Location Using TDOA and FDOA Measurements", IEEE Transactions on Signal Processing, vol. 52, No. 9, Sep. 2004, pp. 2453-2463.

C.H. Knapp and G.C. Carter, "The Generalized Correlation Method for Estimation of Time Delay," IEEE Transactions on Acoustics, Speech, and Signal Processing, vol. ASSP-24, No. 4, Aug. 1976, pp. 320-327.

M. Rahnema, "Overview of the GSM System and Protocol Architecture," IEEE Communications Magazine, Apr. 1993, pp. 92-100.

S. Stein, "Algorithms for Ambiguity Function Processing," IEEE Transactions on Acoustics, Speech, and Signal Processing, vol. ASSP-29, No. 3, Jun. 1981, pp. 588-599.

M. Vanderveen, C.B. Papadias, and A. Paulraj, "Joint Angle and Delay Estimation (JADE) for Multipath Signals Arriving at an Antenna Array", IEEE Communications Letters, vol. 1, No. 1, Jan. 1997, pp. 12-14.

M. Wax and I. Ziskind, "On Unique Localization of Multiple Sources by Passive Sensor Arrays," IEEE Transactions on Acoustics, Speech, and Signal Processing, vol. 37, No. 7, Jul. 1989, pp. 996-1000.

B. Yang, "Projection Approximation Subspace Tracking," IEEE Transactions on Signal Processing, vol. 43, No. 1, Jan. 1995, pp. 95-107.

Rick Roberts, "Project: IEEE P802.15 Working Group for Wireless Personal Area Networks (WPANS)," Harris Corporation, Melbourne Florida, Oct. 4, 2004, pp. 1-11.

Stephanie Bell, A Beginners Guide to Uncertainty of Measurement, The National Physics Laboratory of the United Kingdom of Great Britain and Northern Ireland, Teddington, Middlesex, UK, 2001, pp. 1-41.

Amir Leshem, Mati Wax, "Array Calibration in the Presence of Multipath," IEEE Transactions on Signal Processing, vol. 48, No. 1, pp. 53-59, Jan. 2000.

Xin Wang, Zongxin Wang and Bob O'Dea, "A TOA-Based Location Algorithm Reducing the Errors Due to Non-Line-of-Sight (NLOS) Propagation," IEEE Trans. Vehicular Technology, vol. 52, No. 1, Jan. 2003, pp. 112-116.

M. Vanderveen, C. Papadias, A. Paulraj, "Joint Angle and Delay Estimation (JADE) for Multipath Signals Arriving at an Antenna Array," IEEE Communications Letters, vol. 1, No. 1, Jan. 1997, pp. 12-14.

(56) References Cited

OTHER PUBLICATIONS

R. Schmidt, "Multiple Emitter Location and Signal Parameter Estimation," IEEE Transactions on Antennas and Propagation, vol. AP-34, No. 3, Mar. 1986, pp. 276-280.

Y. Chen, M. Zoltowski, "Joint Angle and Delay Estimation for DS-CDMA with Application to Reduced Dimension Space-Time Rake Receivers," Mar. 1999, pp. 2933-2936.

N.J. Thomas, D.G.M. Cruickshank and D.I. Laurenson, "Performance of a TDOA-AOA Hybrid Mobile Location System", 3G Mobile Communication Technologies, Conference Publication No. 477, Mar. 2001, pp. 216-220.

J. Caffery, Jr., and G. Stuber, "Subscriber Location in CDMA Cellular Networks," IEEE Transactions on Vehicular Technology, vol. 47, No. 2, May 1998, pp. 406-416.

J. Caffery. Jr., "A New Approach to the Geometry of TOA Location," IEEE, VTC 2000, pp. 1943-1949.

M.Silventoinen and T. Rantalainen, "Mobile Station Emergency Locating in GSM", Process IEEE International Conference, Personal Wireless Communications, vol. 1, 1996, pp. 232-238.

\* cited by examiner

SYSTEM AND METHOD TO COLLECT AND MODIFY CALIBRATION DATA

CROSS REFERENCES

The present application is related to provisional application No. 60/899,379 entitled "Mobile Location Using Network Measurement Reports" filed on Feb. 5, 2007, which is hereby incorporated by reference in its entirety.

BACKGROUND

The use of wireless communication devices such as telephones, pagers, personal digital assistants, laptop computers, etc., hereinafter referred to collectively as "mobile appliances" or "mobiles stations" has become prevalent in today's society. In recent years, at the urging of public safety groups, there has been increased interest in technology which can determine the geographic position or "geo-locate" a mobile station in certain circumstances.

Estimating the location of a mobile station may require one or more types of calibration data associated with the mobile station (e.g., signal strength, round trip time, time difference of arrival (TDOA), ground truth data, etc.). Determining precise ground truth measurements is important when generating an accurate calibration database. Without accurate ground truth information, the calibration database will contain significant errors which will in turn be reflected by poor location estimates. Any device used to retrieve ground truth data may produce some degree of signal degradation or drop-out. In the case of a GPS receiver used to collect ground truth data, degradation or drop-out could occur, for example, due to poor satellite visibility or high dilution of precision (DOP).

Referring to FIG. 1, a vehicle 40 may be configured with a collection device 45 to collect calibration data. Once calibration data has been obtained, it may be stored locally in an internal memory of the collection device 45, or the data may be transmitted to a receiving base station 60, where the data is stored in a calibration database 50.

The vehicle 40 may include a dead-reckoning device (not shown) to collect data during periods of signal degradation or drop-out. Such devices attempt to calculate the location of the vehicle when GPS location signaling obtained from a GPS satellite 70 becomes unavailable. Dead reckoning operates by estimating a location of a moving vehicle 40 using information, such as, but not limited to, the last accurate GPS location, velocity of the vehicle 40 and may include other known information.

Dead reckoning schemes often produce data results that may be unsatisfactory when attempting to perform a location estimate. FIG. 2 illustrates an exemplary dead reckoning operation. Referring to FIG. 2, a vehicle's estimated position is illustrated by the line (T) along the street. During a dead reckoning operation, there may be an increased chance of location error and the vehicle's estimated position (T) may be erroneous with respect to the actual position of the vehicle.

Current collection procedures utilized to generate a calibration database 50 may also be laborious, time-consuming and expensive. Simplifying the test and measurement equipment (T&M) needed, and the procedures for obtaining calibration data may save time and expenses.

SUMMARY

To increase the accuracy of location estimates, it is important the collected calibration data be as precise as possible. To ensure the integrity of the calibration data after it has been collected, a data modification and/or data replacement algorithm may be implemented to enhance the accuracy of the collected data. Enhancing the collected calibration data may reduce the chances of errors occurring during a subsequent location process. Additionally, generating a calibration database using enhanced collection procedures may simplify the collection process.

One embodiment of the present subject matter is a method for generating a calibration database that may be used to locate a mobile station. The method may include obtaining location data from a plurality of geographic locations within a region and providing a location information database which includes latitude and longitude information for each of a plurality of points within the region. The method may also include determining two points in proximity to one of the plural geographic locations, interpolating between the two points to determine a third point, and entering the location of the third point in the calibration database.

Another embodiment of the present subject matter is method for generating a calibration database employing a wireless device in a region that contains plural streets and intersections of the plural streets. The method may include obtaining location data of a plurality of geographic locations situated within a region from the wireless device and providing a location information database including latitude and longitude information for each of a plurality of points within the region. The method may also include determining a status of the wireless device, determining from the status a most likely street the wireless device is located for a first one of the plural geographic locations, and determining a first point of the plural points that is in proximity to said first geographic location. The method may then enter the first point in the calibration database.

Another embodiment of the present subject matter is a system for generating a calibration database. The system may include a first database containing location data obtained at a plurality of geographic locations within a region and a location information database which includes latitude and longitude information for each of a plurality of points in the same region. The system may also include circuitry for determining points in the location information database that are in proximity to a geographical location, circuitry for interpolating between the points to determine a third point, and circuitry for entering the third point in the calibration database.

Another embodiment of the disclosed subject matter is a system for generating a calibration database in a region with plural streets and intersections using a wireless device. The system may include a wireless device for obtaining location data at geographic locations within a region and a location information database that includes latitude and longitude information for a plurality of points within the region. The system may also include circuitry for determining a status of the wireless device, circuitry for determining from the status which street the wireless device is situated upon for a geographic location, circuitry for determining a first point proximate to the geographic location, and circuitry for entering the first point in the calibration database.

These and other advantages of the disclosed subject matter over the prior art will be readily apparent to one skilled in the art to which the disclosure pertains from a perusal of the claims, the appended drawings, and the following detailed description of the preferred embodiments.

DETAILED DESCRIPTION

Ground truth data observed from a data collection device (i.e., a GPS receiver) may be collected and stored in a calibration database and compared to a street database to modify and enhance the calibration data for increased accuracy. Increasing the accuracy of the ground truth data may in turn provide more accurate location results.

Calibration data may include a set of location data obtained by any of a variety of data collection devices and techniques. Some exemplary collection devices may include a GPS receiver that receives satellite location signals, and a terrestrial geo-location device that measures received signal strengths from base stations or other wireless signaling devices. Assuming a set of location data have been obtained by one or more of types of data collection devices, the location data may be compared to other data sources to determine the degree of data deviation and to ensure the data's integrity.

In a geographical area that contains multiple streets, highways, etc. having corresponding intersections, there may be a probability of collecting erroneous location point data regardless of the type of data collection device. A street database may be used as a supplemental data source to compare and/or check the integrity of collected location data. The street database may be a compilation of latitude, longitude and other forms of geographical location data, and may also provide ancillary information such as the direction of one-way streets, off-street territories, etc. The street database data may be stored in the same database 50 used to store the collected ground truth data or may be stored in a separate database.

Figure 1:
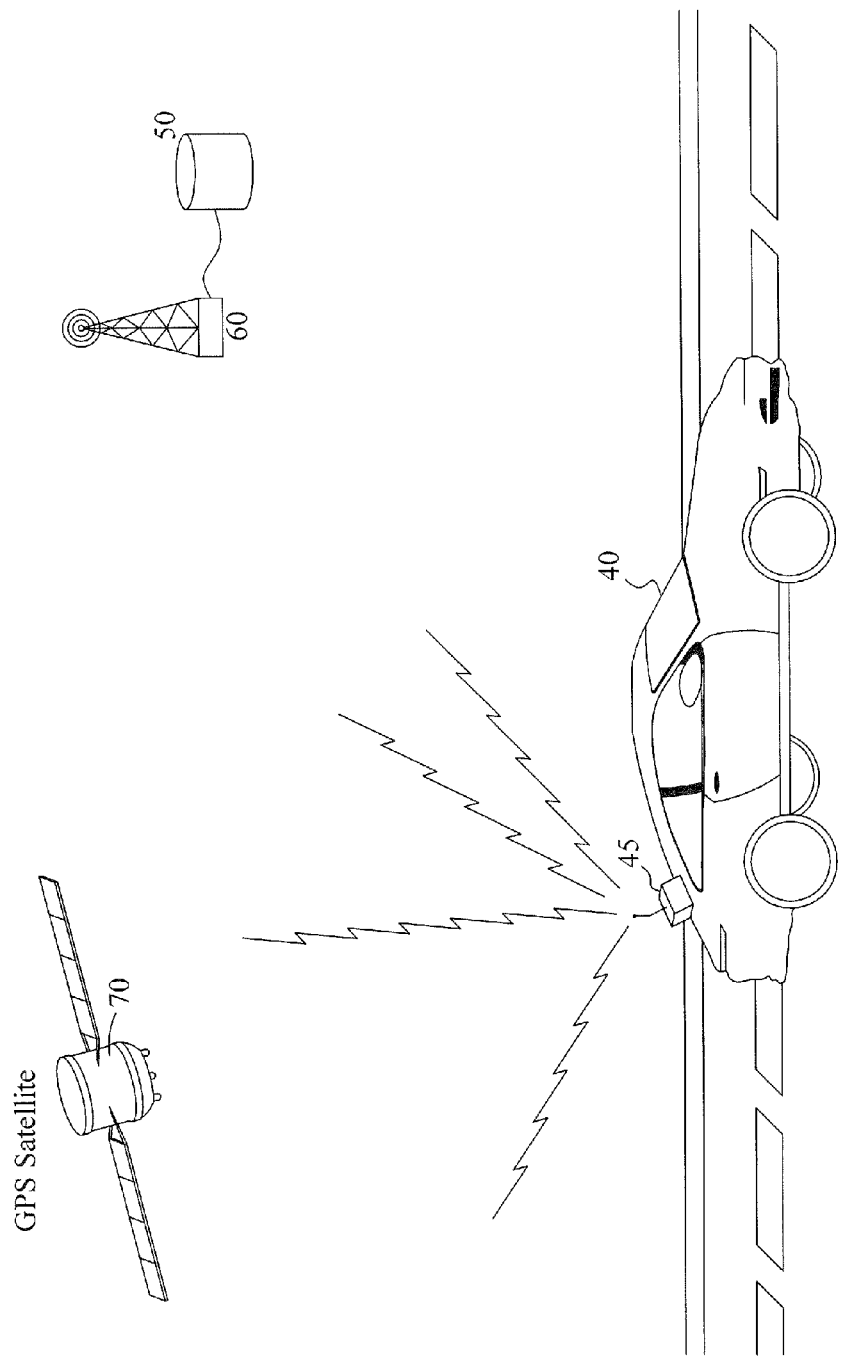
FIG. 1 illustrates an exemplary calibration data collection system.
Figure 2:
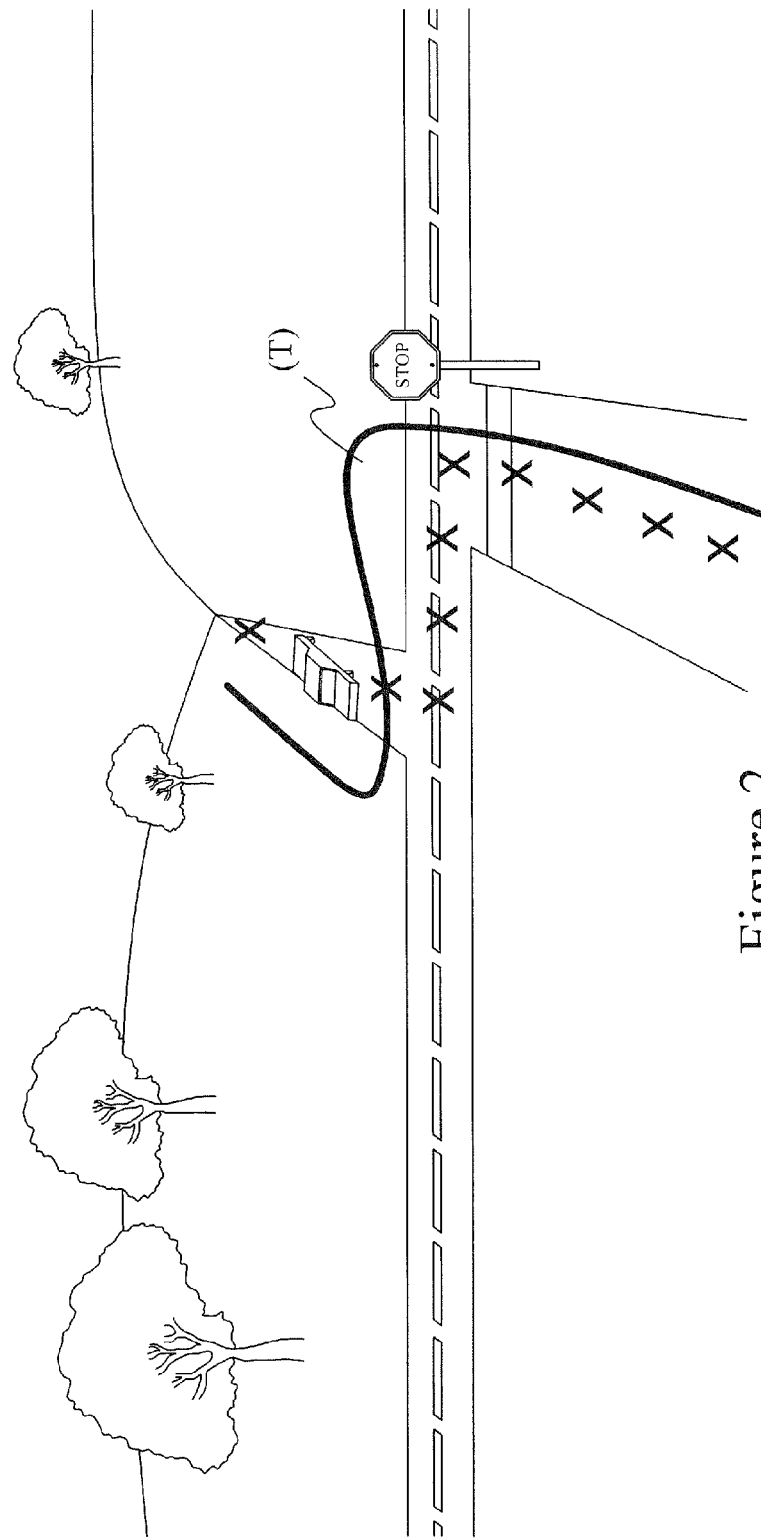
FIG. 2 illustrates an example of dead reckoning.

The precise latitude and longitude positions of streets may be included in the street database. Referring to FIG. 2, if a data collection procedure relied on dead reckoning to determine ground truth data due to a lost GPS satellite signal, the resulting data will have an increased likelihood of producing an off-street and/or erroneous location estimate.

Location data may be modified using a location information database (e.g., a street database) as an optimum overlay. The location information database may provide a set of latitude and longitude information that can be used as an overlay guide, which may be compared and matched to the collected location data. Determining which street the collection process was conducted on may be a prerequisite for selecting which set of data to use for data enhancing purposes. A set of collected location points may substantially parallel a set of data in a street database, and may provide an accurate overlay for comparison purposes. Alternatively, the street database may demonstrate inconsistencies between a first street and a nearby street that may require clarification. The location information database may be selected to overlap the geographic area of the respective collected location data. The overlapped region may be designated by coordinates, street, town, Zip code or other geographic area descriptor.

Checking the integrity of each retrieved ground truth location point may include matching each point to the closest street in the street database. In another example, a set of points may be matched to a particular street based on the proximity of a group of points. A location data point or set of location data points may be represented in a data vector(s), where each data vector has at least one parameter associated with a particular location. Each data vector used for location estimation may have, for example, N components with at least one of its components as the location, and where the other N−1 components may apply to other data signal components.

Figure 3:
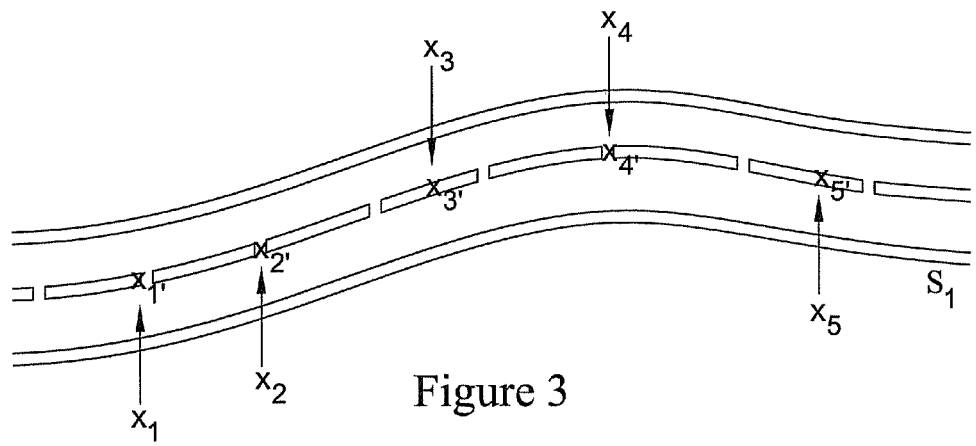
FIG. 3 illustrates an example of location point position estimation.

Referring to FIG. 3, data points $x1$, $x2$, $x3$, $x4$ and $x5$ may have been measured by a vehicle driving on the street (S1). Once the measurements at the data points are obtained, a location information database, such as a map database can be used to match the measured data points ($x1$-$x5$) to points located on the actual street $x1'$, $x2'$, $x3'$, $x4'$ and $x5'$, which are stored in the street database. In this case, the street (S1) provides a simple way to perform a comparison and adjustment procedure to modify the values of the location data with respect to the location data points.

Figure 4:
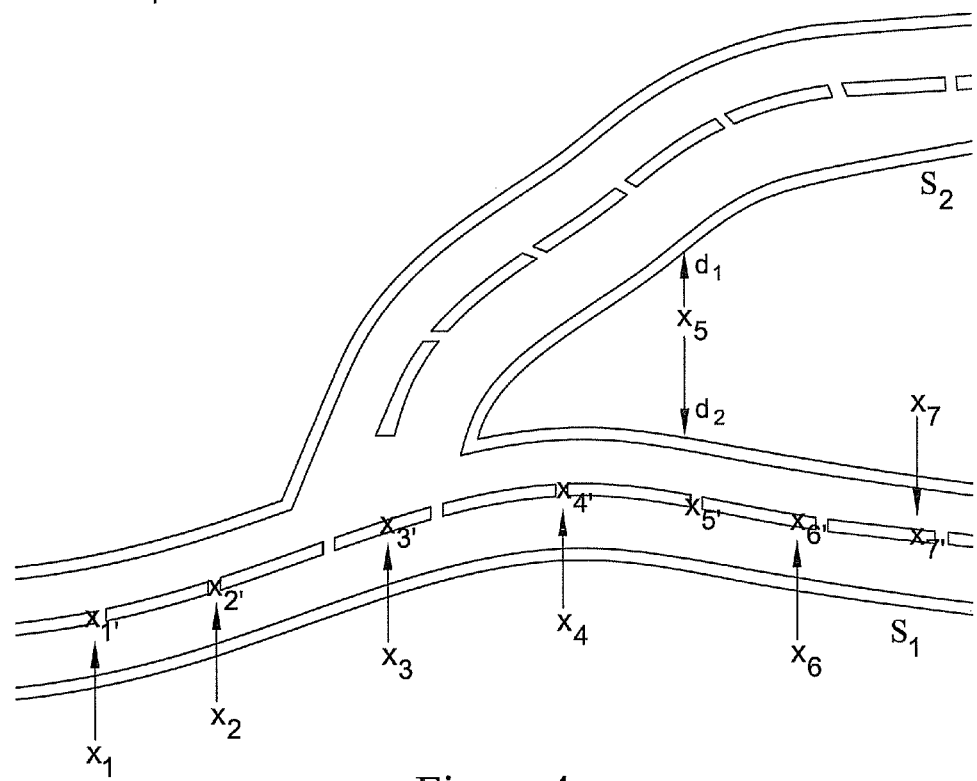
FIG. 4 illustrates another example of location point estimation.

Referring to FIG. 4, a map database may include more than one street (S1, S2). In this non-limiting example, a set of measured data points ($x1$-$x7$) were measured as having an estimated location, for the most part, near street S1; however, the point $x5$ was estimated as being mistakenly closer to S2 than the intended street S1. In this case, it may be useful to apply an algorithm different from the closest street algorithm described above with reference to FIG. 3.

As illustrated in FIG. 4, the location point $x5$ is located a distance d2 from S1, which is greater than a distance d1 from S2. In this case, relying on the historical and/or future street locations of the previously and subsequently measured data points may provide a way to correctly match $x5$ to the correct street S1 regardless of the actual closest street to $x5$. Examining the street mappings of one or more points before and/or after $x5$ (e.g., $x1$-$x4$ before, and $x6$-$x7$ after) it may be determined that $x5$ was intended to be part of S1 and not S2. As a result, the latitude and longitude values corresponding to the intended location of $x5$ (i.e., $x5'$), with respect to S1, may be substituted for the measured position of $x5$.

Once the street overlay is properly matched to the measured point location data collected over a given region, and the intended street location identified with respect to the measured data points, the location data points originally retrieved from a calibration data collection device may be replaced and/or modified with the data derived from the street database. In addition, various other known methods of enhancing the position data may also be applied to increase the integrity of the calibration database and provide accurate ground truth measurements.

Interpolation may also be used as another method to enhance collected ground truth data. If, for example, a collected ground truth data point falls outside of a street location of the street database, the two closest points in the street database may be used in an interpolation operation to determine a third point therebetween. The ground truth of this third point may then be used in subsequent calculations or as a replacement to the ground truth value that was retrieved from the original data collection process.

Historical ground truth information may also be used to enhance collected ground truth data. By keeping track of a data collection vehicle's directional movements and/or maneuvers, a probability calculation or estimate of the most likely street location may be calculated. For example, once ground truth values have been collected in a given region, these values may be modified or replaced with the ground truth values of the most probable candidate street estimated by a probability calculation of the vehicle's historical movements and maneuvers. This may be useful when attempting to correct ground truth data collected in areas with multiple streets or other obstacles likely to create erroneous ground truth data.

Ground truth data enhancement algorithms may be used to complement dead-reckoning results when the results are known to be in error. Enhancement algorithms may also be used to produce location data in situations where the dead-reckoning component of the calibration device/vehicle may be unavailable. Ground truth exclusion criteria may be applied to limit the amount of erroneous data that is stored in the calibration database. If, for example, ground truth data is obtained via a GPS receiver, a predetermined threshold value may be established to require a certain number of visible satellites be available before the ground truth data is accepted.

A predetermined threshold value may be used to limit the data received from a particular set of measurement devices having a dilution of precision (DOP) beyond an acceptable threshold value. For example, if a group of measuring devices are located too close together then the distances between the measuring devices may be compared to the predetermined threshold, and as a result of the devices being under the acceptable separation distance, the data may be considered unacceptable and disregarded. Similarly, a threshold distance may be established as a minimum distance requirement to limit ground truth collection efforts within a particular distance from a last valid GPS reading. Other methods may also be used to limit the amount of erroneous or unnecessary ground truth data obtained and stored in the calibration database.

Calibration data collection procedures that utilize autonomous test and measurement (T&M) equipment may simplify the ground truth collection process. Simplifying the T&M equipment and/or creating autonomous procedures for data collection may allow highly mobile vehicles and untrained drivers to perform calibration data collection processes. For example, public transportation vehicles such as buses or taxi cabs, highly mobile vehicles such as FedEx/UPS trucks, etc., or other types of vehicles that travel often within the calibration area may be prime candidates for installing the T&M equipment and performing the collection process.

Figure 5:
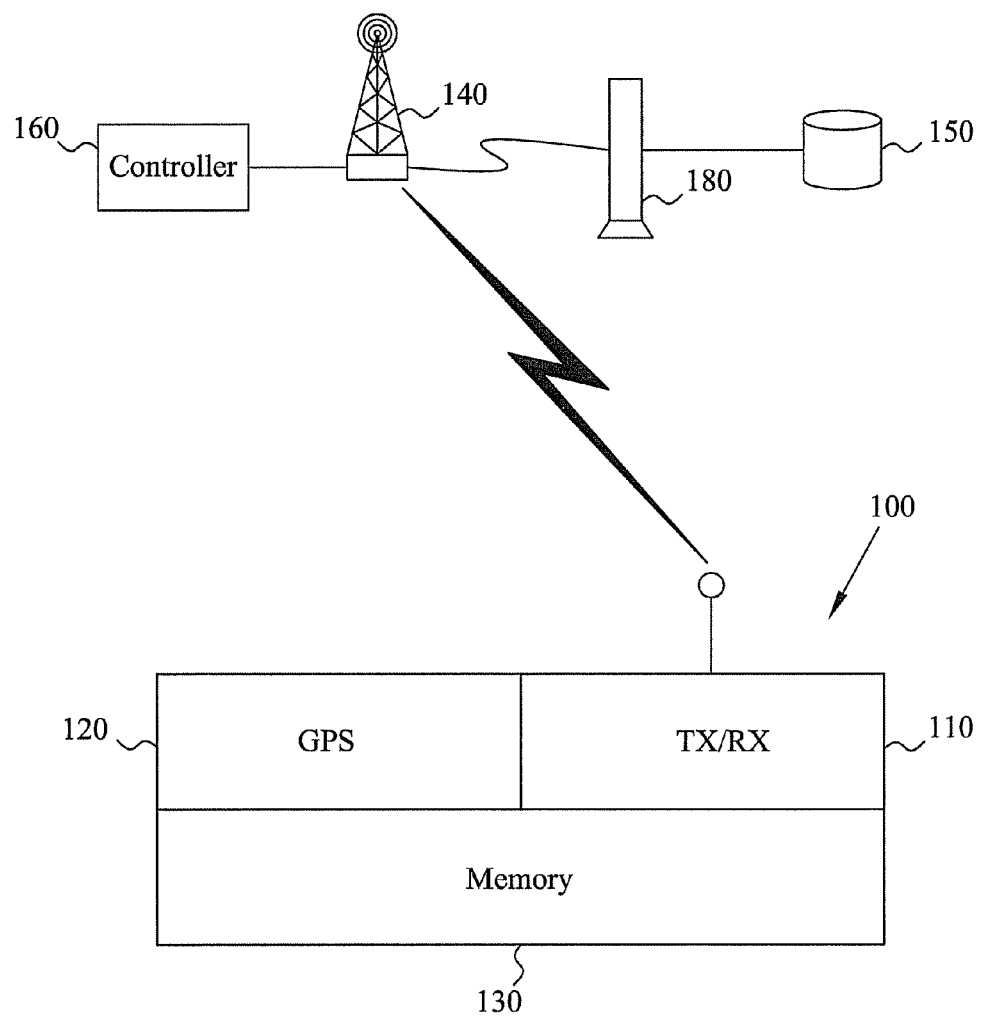
FIG. 5 illustrates a block diagram calibration data collection system.

Referring to FIG. 5, autonomous T&M equipment (ATME) 100 may include a wireless terminal 110 that is capable of measuring received signal strengths of serving and neighboring cell base stations and other wireless communication transmissions, a location device that computes the ground truth location of the wireless terminal 110, such as a GPS receiver 120, and a memory 130 that stores the results of the collection efforts.

ATME 100 may include storage capability to store received signals (i.e., memory 130), such as, signal strength data of the serving and/or neighboring cell base stations or other network information such as cell global identity (CGI), broadcast control channel (BCCH), base station identity code (BSIC), and/or corresponding ground truth location data.

ATME 100 may be capable of sending data stored in the memory 130 to a server 180 using available baseband and/or broadband wireless data transfer technology such as GPRS, 2G, 2.5G, 3G, 4G, etc. ATME 100 may be in communication with an ATME controller unit 160, which may be located at a serving base station (BS) 140 or another location within the communication range of the ATME 100.

The controller unit 160 may monitor the statistical sufficiency of the data available for the current location of the ATME 100, and may further implement tests to measure the statistical sufficiency to determine whether new data should be added to the existing calibration database 150. In addition, the ATME controller 160 may be linked to a non-uniform grid (NUG) or uniform grid (UG) generator permitting grid point generation and/or augmentation to proceed in parallel with the data acquisition from the ATME 100. Grid points (e.g., NUGs) are another way to organize and/or realize information related to a wireless networking environment.

Figure 6:
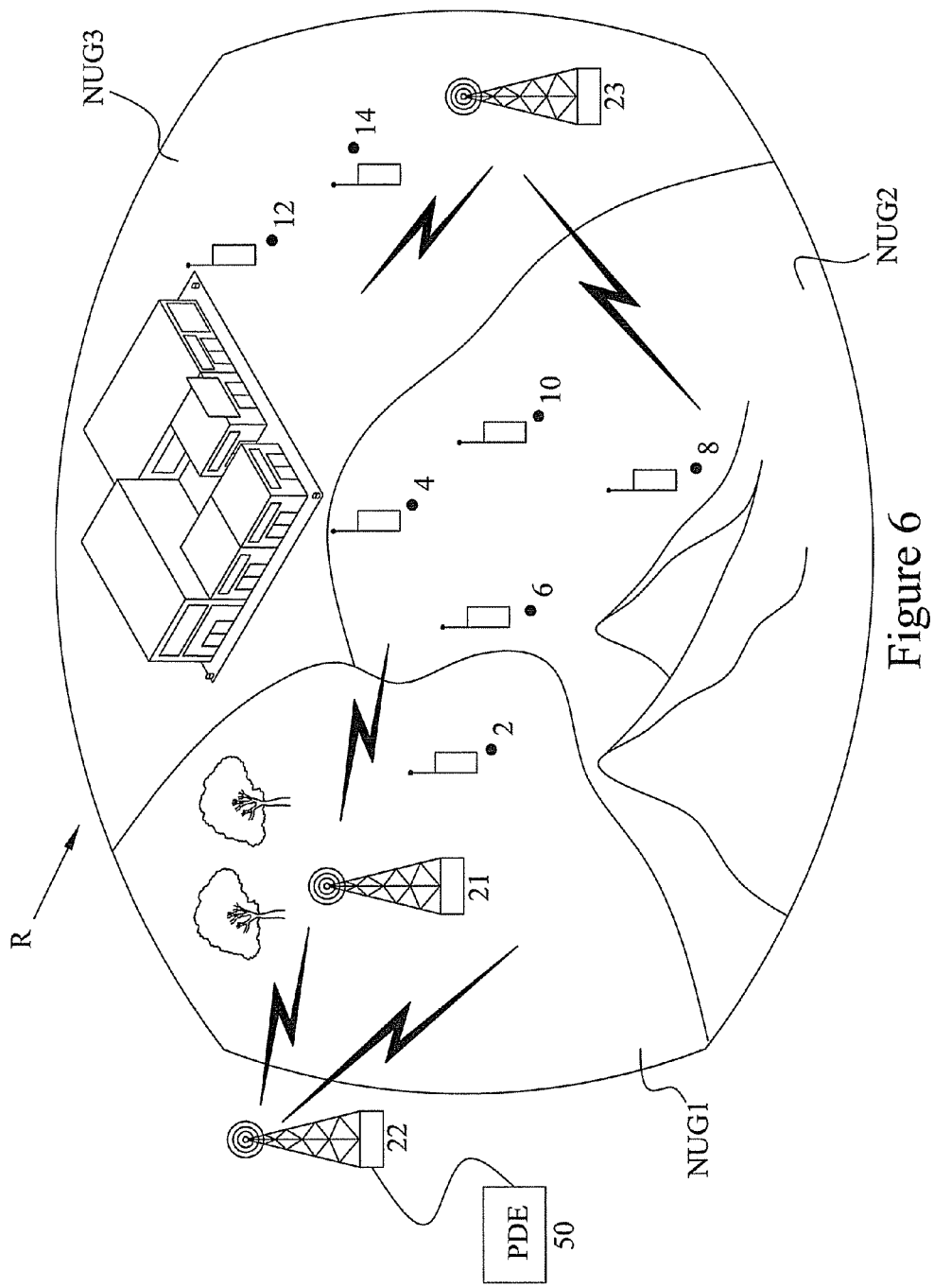
FIG. 6 illustrates an exemplary non-uniform grid (NUG) region (R).

A NUG is described in detail in co pending application Ser. No. 12/068,213 titled "SYSTEM AND METHOD FOR GENERATING NON-UNIFORM GRID POINTS FROM CALIBRATION DATA," the entirety of which is incorporated herein by reference. A NUG may be generated to represent the signal characteristics and calibration data over a given region. FIG. 6 illustrates a geographical region (R) having NUGs represented by NUG1, NUG2 and NUG3. The NUGs represent an area of collected calibration data based on data collected via data collection devices and/or signals transmitted from the mobile stations (MSs) identified within the geographical region of the NUG (e.g., (MS 2 and BS 21-NUG1), (MS 4, 6, 8 and 10-NUG2) and (MS 12, 14 and BS 23-NUG3)). The BS 22 may serve one or more NUGs and may be located outside the region (R) of the identified NUGs. The different NUGs may be separated based on geographical considerations (e.g., mountains, buildings, streets) or varying concentrations of MSs.

Network measurement reports (NMRs) may be used to represent the current estimated location and/or signal characteristics of a MS. An exemplary NMR may be represented as a data vector containing measured signal power level parameters (e.g., P1, P2, P3) and may include one or more location parameters (i.e., latitude and longitude).

An exemplary NMR may be represented by the data vector [P1, P2, P3, LAT1, LONG1, TA1]. The power levels (P1-P3) may represent the power levels of three separate base stations (BSs 21-23) as measured at a particular latitude and longitude location (LAT1, LONG1). TA1 is a non-limiting example timing advance parameter. A NMR may contain any number and type of parameters used to estimate the location of a MS. NMRs may be transmitted from the MS or from other wireless network components to position determining equipment (PDE) 50 or other types of processing units to process the received information, and/or attempt to locate the MS.

The value of the timing advance (TA) parameter corresponds to the length of time a signal from a MS takes to reach a particular BS. A MS may be configured to transmit data signals at specific timeslot intervals depending on the type of wireless communication protocol employed (e.g., TDMA, GSM, 3GPP etc.). Using the speed of light (c=3*10^8 m/s) as a reference velocity for the radio waves, the TA parameter may be increased or decreased depending on the distance between the MS and the BS. The TA parameter may need to be adjusted periodically as the distance from the MS to the BS changes.

If statistically sufficient and/or recent data is available for the current NUG configuration then there would be no reason to overload the existing calibration database 150 with further data for that location. Thus, a continuous examination of the reported data will allow for selective and judicious insertion of such data into the calibration database 150. The examination of the reported data may be performed by the controller unit 160 and/or one or more of the other network components of the data collection system (i.e., server 180). If after an examination of the currently stored calibration data it is determined that the current level of collected data for a particular region is sufficient, then the current calibration efforts may be paused or stopped until instructed to return to an operating status.

Depending on the requirements for collecting data from a particular location, it is also envisioned turning the ATME 100 off when, for example, the vehicle containing the ATME 100 is parked, immobilized, or is traversing a region for which acceptable data has already been obtained.

The ATME 100 may also be used to alert the ATME controller 160 to changes in the wireless network. Changes, such as, a site going down, a new site being enabled or the transmit power changing at an antenna are all examples of changes that may be recognized more readily by the ATME controller 160 when a continuous data stream is arriving from the ATME 100, than if one were to rely on information communicated by a network operator of the location system. The constant communication of the ATME 100 with other network operations components may serve as an early warning device to the location system.

The ATME 100 may determine its future position based on communication with the ATME controller 160. It may be necessary to predict the future position where the ATME controller 160 is operating within the NUG generation process. In this example, consider the ATME 100 collecting data at a particular location, the ATME 100 passes available NMR data to the ATME controller 160. This NMR data includes, for example, an associated location time-stamp, a velocity stamp and a range of other possible parameters in addition to the usual NMR parameters. The ATME controller 160 may signal to the ATME 100 when it no longer needs data at that particular location, thus permitting the ATME 100 to move out of the current location before resuming data collection.

Depending on the rate at which the reported data changes, the ATME controller 160 can optionally inform the ATME 100 the desired speed of travel permitted to efficiently collect and/or communicate collection data results without error. With this additional information, an ATME 100 may be sent instructions to a driver to either dwell for longer periods in certain locations or move abruptly out of locations where the reported data is statistically similar. As a result, the dwell-time for such an ATME 100 in a particular region may be optimized so that no time is unnecessarily wasted collecting data in a region where extra NMR data is not required or an increased amount of time spent collecting data in a region where more NMR data may be required.

Some of the features of an ATME 100 may also be applied to the case where such features are interfaced with a human driver of the vehicle carrying the ATME 100 equipment. In such a situation, the human driver may be instructed by the controller 160 using voice commands to slow down, speed up, turn at the next intersection, etc. Further, in either the case of a human driver or unmanned communication equipment, regions where data insufficiency or statistical failure exist may be flagged as regions where a return to that area may be needed.

In a particular traffic situation where the driver has no option but to keep moving even though the data requirement of the ATME controller 160 calls for a slower collection driving velocity, the driver may continue to circle around the region (e.g., block) until the ATME controller 160 indicates to the ATME 100 equipment driver that sufficient data collection has been met.

In general, the division of labor between fully automated components within this scheme and human enablers for the same purpose may take various forms ranging from a fully automated case to the case where the reporting of NMR data is conducted manually.

When statistical sufficiency or data sufficiency is met in a particular region, the ATME 100 may randomly proceed to a next region or be guided to a particular region by the ATME controller 160, which may have information on areas where the known data is insufficient or where particular NUGs need to be built or refined. It may be true that, in general, the ATME 100 will spend less time per unit area in a rural setting where the statistical nature of the NMRs change slowly as opposed to an urban setting that has vigorous dynamic NMR changes over short distances. The total time required to calibrate a particular region may also be reduced for the purpose of a pattern matching location scheme.

In contrast to the blind acquisition of NMR data by a device which has no knowledge of whether the data being reporting is useful, needed, or in the other extreme, excessive, the intelligent calibration data collection process may increase location system productivity and location estimate accuracy.

Figure 7:
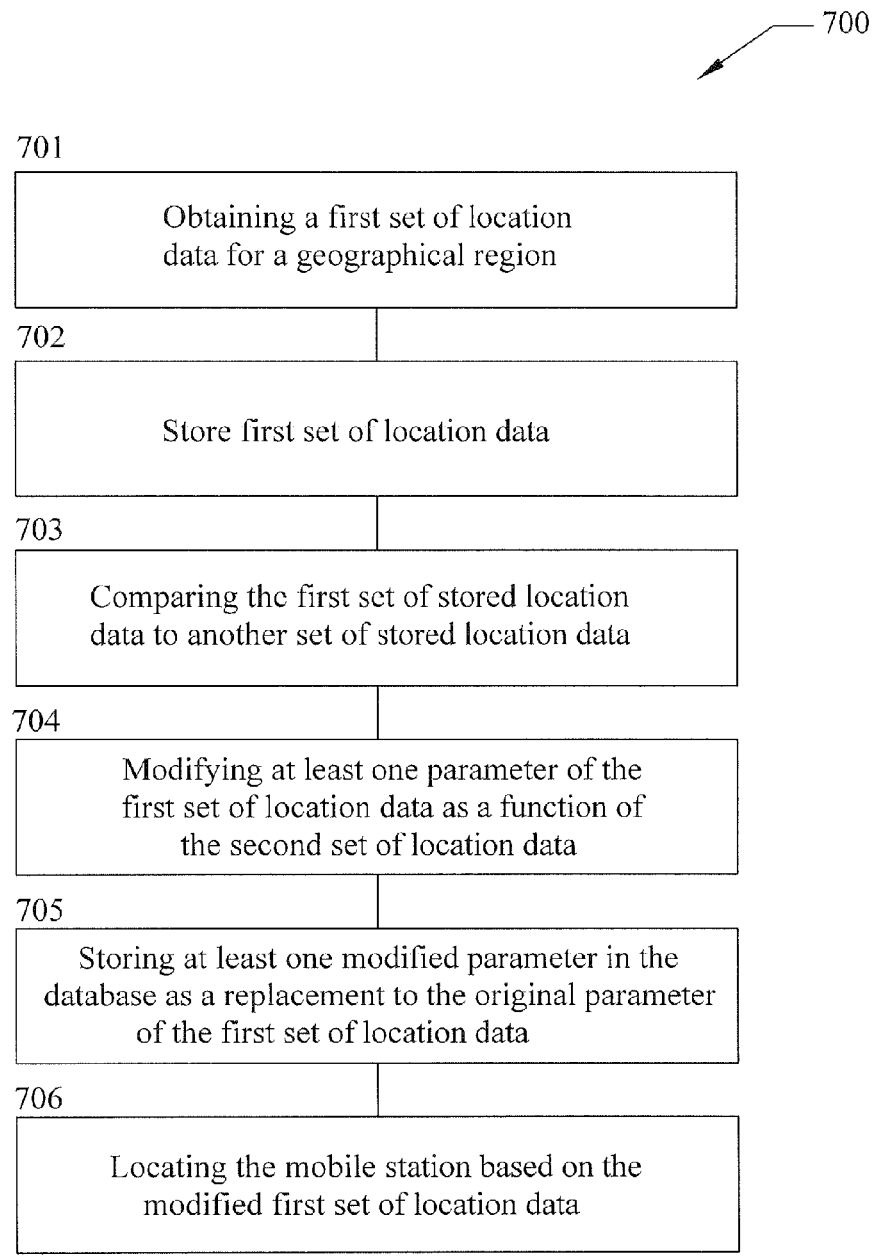
FIG. 7 illustrates a flow diagram according to an exemplary embodiment.

FIG. 7 illustrates a flow diagram 700 of a method to modify location data used to locate a mobile station. A first set of location data may be obtained for a geographical region (operation 701). The first set of location data may be stored in a database (operation 702). The first set of stored location data may be compared to a second set of stored location data (operation 703), which represents an overlapping geographical region of the first set of location data. Next, at least one parameter of the first set of location data may be modified to represent a particular location based on the second set of location data at that particular location (operation 704). The modified parameter may be stored in the database as a replacement to the original parameter of the first set of location data (705). The mobile station may then be located based on the modified first set of location data (706).

Figure 8:
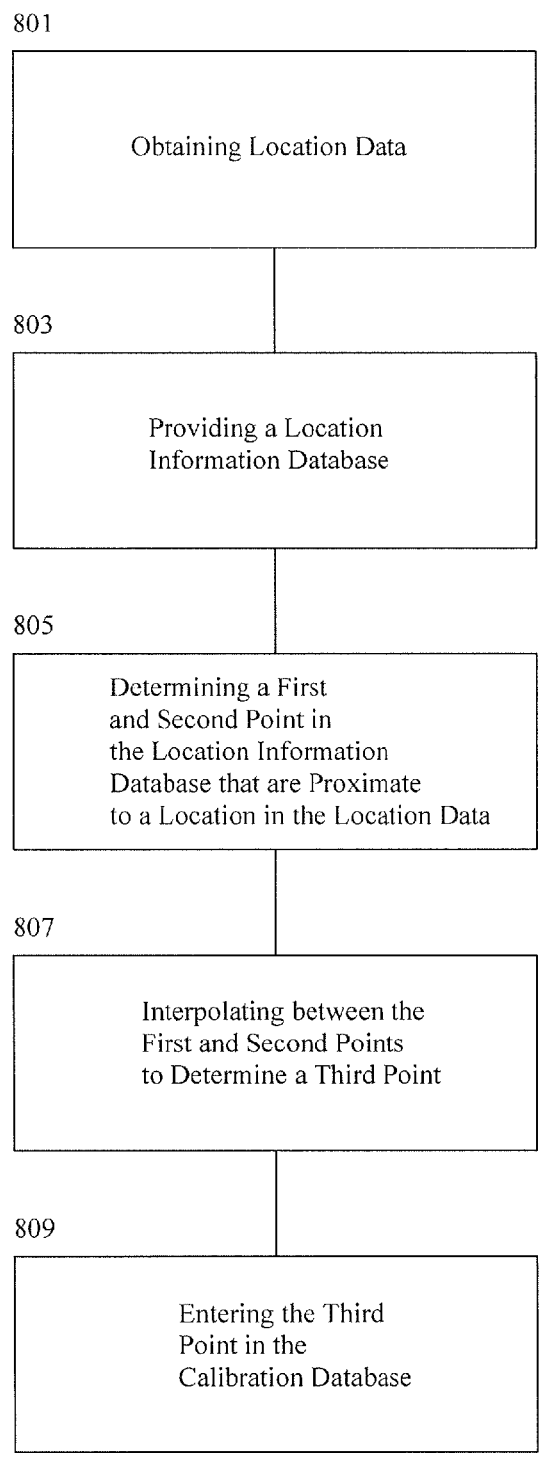
FIG. 8 illustrates a flow diagram according to an embodiment of the present subject matter.

FIG. 8 is an illustration of a method for generating a calibration database. Location data may be obtained for a plurality of geographic locations situated within a selected geographic region (801). A location information database having accurate latitude and longitude information for plural points in the same geographic region may be provided, such as a street database (803). From the plural points in the location information database a first and second point may be determined that are proximate to a location in the location data (805). Using interpolation between the first and second points a third point may be determined (807). The third point may be entered into a calibration database as the location associated with the location data for the geographic location (809).

Figure 9:
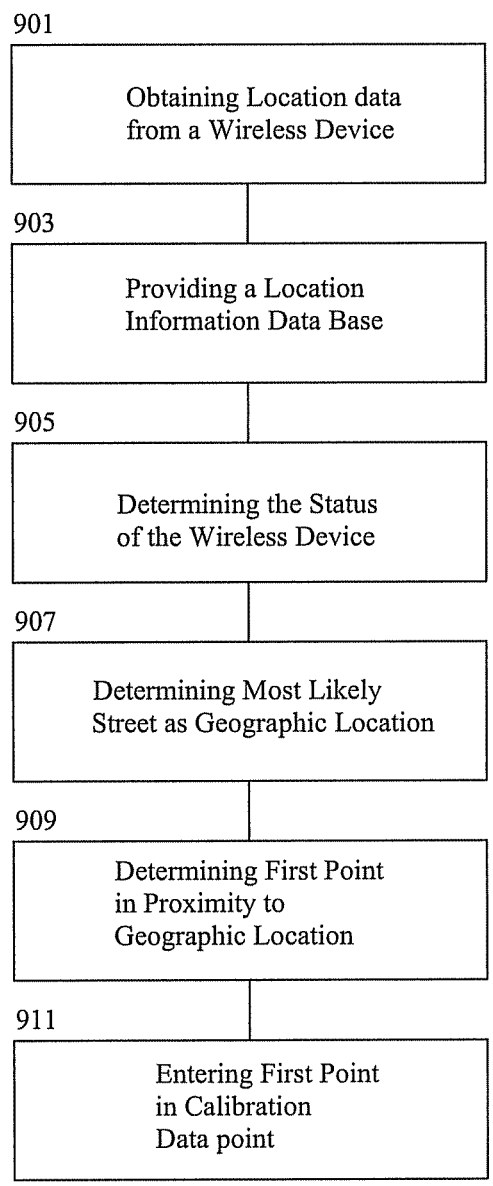
FIG. 9 illustrates a flow diagram according to another embodiment of the present subject matter.

FIG. 9 is an illustration of a method for generating a calibration database using a wireless device. Location data may be obtained for a plurality of geographic locations situated with in a region having plural streets and intersections (901). In one embodiment the location data may be obtained using a wireless device. A location information database having accurate latitude and longitude information for plural points in the same geographic region may be provided, such as a street database (903). The status of the wireless device may be determined (905), and based upon the status, a most likely street upon which the wireless device is sited may be determined as the geographic location (907). A first point from the location information database may be determined that is in proximity to the first geographic location (909) and the first point may then be entered in the calibration database (911).

The embodiments described above may be used in base station configurations that include, but are not limited to, predetermined data collected over varying terrain, varying base station configurations, varying cellular communication protocols, etc.

While preferred embodiments of the present invention have been described, it is to be understood that the embodiments described are illustrative only and the scope of the invention is to be defined solely by the appended claims when accorded a full range of equivalents, many variations and modifications naturally occurring to those skilled in the art from a perusal hereof.

What is claimed is:

1. A method for generating a calibration database, comprising:
   receiving at a wireless device an attribute of a signal transmitted by a base station to a mobile station in a region;
   wirelessly transmitting from said wireless device said attribute to a controller unit;
   obtaining location data at a plurality of geographic locations situated within said region, wherein said location data for any one of said plural geographic locations is determined using said wireless device;
   providing a location information database wherein said location database includes latitude and longitude information for each of a plurality of points within said region;
   determining a first point and a second point of said plural points that are in proximity to a first one of said plural geographic locations; and
   interpolating between said first and second points to thereby determine a third point and entering said third point in said calibration database, and associating the location data for the first one of said plural geographic locations determined by said wireless device with the third point.

2. The method of claim 1 wherein said attribute is selected from the group consisting of: signal strength, Cell Global Identity, broadcast control channel, base station identity code.

3. The method of claim 1 further comprising determining at said controller unit if said location data is statistically sufficient and if so entering said location data into said calibration database.

4. The method of claim 1 further comprising determining at said controller unit if said location data is statistically sufficient and if so entering said location data into a non-uniform grid generator.

5. The method of claim 1 further comprising sending future positioning information from said controller unit to said wireless device.

6. The method of claim 5 wherein said future positioning information includes at least one of a geographic position and a speed.

7. The method of claim 5 further comprising determining said future positioning information at least in part on information from said location information database.

8. The method of claim 5 further comprising determining said future positioning information at least in part on information from a non-uniform grid generator.

9. The method of claim 1 further comprising receiving at said wireless device an attribute of a signal transmitted by the base station to a mobile station in a second region.

10. The method of claim 1 wherein said region contains plural streets and intersections of said plural streets.

11. The method of claim 10 wherein said location information database is a street database.

12. The method of claim 11 further comprising the step of determining if said first geographic location is situated on one of said plural streets and only if said first geographic location is situated on one of said plural streets entering said geographic location in said calibration database.

13. A system for generating a calibration database, comprising:
   a first database containing location data obtained at a plurality of geographic locations situated within a region, said location data for any one of said plural geographic locations is determined using a wireless device and said wireless device receives an attribute of a signal transmitted by a base station to a mobile station in said region;
   a wireless device transmitter for transmitting from said wireless device said attribute to a controller unit;
   a location information database wherein said location database includes latitude and longitude information for each of a plurality of points within said region;
   circuitry for determining a first point and a second point of said plural points that are in proximity to a first one of said plural geographical locations;
   circuitry for interpolating between said first and second points to thereby determine a third point; and
   circuitry for entering said third point in said calibration database; and,
   circuitry for associating the location data for the first one of said plural geographic locations determined by said wireless device with the third point.

14. The system of claim 13 wherein said attribute is selected from the group consisting of: signal strength, Cell Global identity, broadcast control channel, base station identity code.

15. The system of claim 13 wherein said controller unit determines if said location data is statistically sufficient and if so, enters said location data into said location information database.

16. The system of claim 13 wherein said controller unit determines if said location data is statistically sufficient and if so enters said location data into a non-uniform grid generator.

17. The system of claim 13 wherein said controller unit sends future positioning information to said wireless device.

18. The system of claim 17 wherein said future positioning information includes at least one of a geographic position and a speed.

19. The system of claim 17 wherein said future positioning information is determined based at least in part on information from said location information database.

20. The system of claim 17 wherein said future positioning information is determined based at least in part on information from a non-uniform grid generator.

21. The system of claim 13 wherein said wireless device receives an attribute of a signal transmitted by the base station in communication with a mobile station in said second region.

22. The system of claim 13 wherein said region contains plural streets and intersections of said plural streets.

23. The system of claim 22 wherein said location database is a street database.

24. The system of claim 23 further comprising circuitry for determining if said first geographic location is situated on one of said plural streets and circuitry for entering said geographic location in said calibration database only if said first geographic location is situated on one of said plural streets.

* * * * *